United States Patent [19]

Jacobs

[11] Patent Number: 5,415,744
[45] Date of Patent: May 16, 1995

[54] REMOVAL OF CONTAMINANT MATERIAL FROM A SOIL SITE

[75] Inventor: Richard A. Jacobs, Arlington, Mass.

[73] Assignee: Massachusetts Institute of Technology, Cambridge, Mass.

[21] Appl. No.: 252,442

[22] Filed: Jun. 1, 1994

[51] Int. Cl.$^6$ .............................................. B01D 61/56
[52] U.S. Cl. .................................. 204/130; 204/180.1; 204/182.2; 588/204
[58] Field of Search ................... 204/130, 180.1, 182.2; 588/204

[56] References Cited

U.S. PATENT DOCUMENTS

| | | | |
|---|---|---|---|
| 2,831,804 | 4/1958 | Collopy | 204/131 |
| 3,417,823 | 12/1968 | Faris | 166/45 |
| 3,424,662 | 1/1969 | Hudgins, Jr. et al. | 204/180 |
| 3,782,465 | 1/1974 | Bell et al. | 166/248 |
| 4,115,233 | 9/1978 | Griffith | 204/180 R |
| 4,132,625 | 1/1979 | Peterson et al. | 204/299 R |
| 4,305,800 | 12/1981 | Christenson | 204/180 R |
| 4,453,594 | 1/1984 | Patton et al. | 166/248 |
| 4,479,857 | 10/1984 | Barton, Jr. | 204/130 |
| 4,495,990 | 1/1985 | Titus et al. | 166/65 R |
| 4,956,535 | 9/1990 | Buelt et al. | 219/10.81 |
| 5,074,986 | 12/1991 | Probstein et al. | 204/130 |
| 5,098,538 | 3/1992 | Kim et al. | 204/182.2 |
| 5,114,277 | 5/1992 | Murphy et al. | 405/231 |
| 5,137,608 | 8/1992 | Acar et al. | 204/130 |
| 5,240,570 | 8/1993 | Chang et al. | 204/130 |

FOREIGN PATENT DOCUMENTS

| | | |
|---|---|---|
| 2001076 | 4/1991 | Canada . |
| 8702005 | 8/1987 | Netherlands . |
| 762913 | 7/1978 | U.S.S.R. . |
| 865225 | 7/1979 | U.S.S.R. . |
| WO93/09888 | 5/1993 | WIPO . |

OTHER PUBLICATIONS

"Fundamentals of Soil Behavior", James K. Mitchell, Second Edition, University of California, Berkeley. no date.

English Abstract of 007847339. NL patent 188,415B Jan. 1992.

"Potential Uses of Electro-Kinetics for Hazardous Waste Site Remediation", James K. Mitchell, Aug. 4–5, 1986.

"Determination of pH Gradients in the Electrochemical Processing of Kaolinite", Greg A. Putnam, Dec., 1988.

Primary Examiner—Kathryn Gorgos
Assistant Examiner—Arun S. Phasge
Attorney, Agent, or Firm—Robert F. O'Connell; Ernest V. Linek

[57] ABSTRACT

A method for removing contaminants from soil site regions in which at least one source electrode is positioned in the soil site and is surrounded by a plurality of sink electrodes so that voltage gradients are established between the source electrode and the sink electrodes. A purging liquid is supplied to the source electrode and is permitted to flow therefrom into the soil site. The voltage gradients cause the purging liquid to move by electroosmosis through the soil site toward the sink electrodes to displace the contaminant material therein and to cause a substantial portion of the contaminant to be moved into the sink electrodes from which the contaminant can be removed.

19 Claims, 2 Drawing Sheets

REMOVAL OF CONTAMINANT MATERIAL FROM A SOIL SITE

INTRODUCTION

This invention relates generally to the removal of contaminants from hazardous waste sites by electroosmosis techniques using a purging liquid and, more particularly, to the unique placement of electrodes in such a waste site to provide the most effective contaminant removal.

BACKGROUND OF THE INVENTION

A method for removing contaminant material from a soil site has been described in U.S. Pat. No. 5,074,986 issued to R. F. Probstein et al. on Dec. 24, 1991. In the method described in the Probstein patent, one or more source electrodes are positioned at one or more first locations in the soil site and one or more sink or collector electrodes are positioned at one or more second locations therein. Voltage gradients are established among the source and sink electrodes and a purging liquid is externally supplied to the source electrode(s) and flows therefrom into the soil site. The purging liquid thereupon moves by electroosmosis through the soil site from the source electrode(s) thereby displacing the contaminant material so as to cause it to be moved into the sink electrode(s) from which it is in turn removed from the site.

One technique for electrode placement that was considered therein is to use parallel electrode arrays where a plurality of source electrodes and sink electrodes are arranged in alternating rows throughout the soil site. Because of the relatively large numbers of electrodes required and because the contaminant material must be collected from so many sink electrodes, the manifolding thereof is complicated and relatively costly so that such an arrangement, though effective, is believed to be economically inefficient for many practical situations.

Alternatively, it has been suggested that an effective placement pattern of electrodes in a soil site for soil dewatering and consolidation processes would include the providing of a plurality of source electrodes which are positioned so as to surround a single sink electrode (or a small number of closely spaced sink electrodes). Such an electrode configuration pattern might be considered as desirable in a contaminant removal process in order to make the removal process more effective since the number of sink electrodes can be considerably reduced, often to a single one, and placed at only one relatively small region of the site. Accordingly, the need for a large number of removal channels is eliminated and the cost thereof is substantially reduced. The use of such a pattern, which provides an inwardly radial flow from the source electrodes to the sink electrode, is discussed, for example, in connection with soil dewatering and consolidation processes in the text "Fundamentals of Soil Behavior" by James K. Mitchell, John Wiley and Sons, New York, 1993, 2nd Edition, pp. 256–285.

However, analysis of such a pattern for use in a contaminant removal process of the type described in the Probstein et al. patent shows that relatively large areas of the soil site are left uncleaned, severely limiting the contaminant removal efficiency for the overall site. Moreover, there is no control over what flows into the region so that further contaminant may flow therein from outside the site region and/or the soil may dewater to such an extent that flow may cease, either temporarily or permanently, thereby interrupting the removal process. It is desirable, therefore, to provide a different more satisfactory electrode arrangement which produces the most effective removal of contaminant material from an entire soil site.

BRIEF SUMMARY OF THE INVENTION

In accordance with the invention, in order to avoid the disadvantages of the above discussed electrode array patterns when used in a contaminant removal system of the type disclosed in the Probstein et al. patent, an arrangement of electrodes includes the placement of a plurality of sink electrodes in a manner such as to effectively surround a single source electrode or, alternatively, relatively few closely spaced source electrodes, thereby providing an outward radial flow from the source electrode(s) toward the sink electrodes. The geometry of such an electrode pattern generates an effective electric field distribution which produces the outward radial flow from the source electrode(s). It has been found that such an approach provides significantly higher levels of contaminant removal for a given volume of purge liquid used in the system than the suggested use of a sink electrode surrounded by a plurality of source electrodes.

DESCRIPTION OF THE DRAWINGS

The invention can be be understood with the help of the accompanying drawings wherein.

DESCRIPTION OF THE INVENTION

Since the basic structure and operation of a system in which the novel technique of the invention can be used are clearly shown and discussed in the aforesaid Probstein et al. patent, such description need not be repeated here and the disclosure of such patent is incorporated by reference herein. The figures herein show diagrammatic representations of electrode patterns in accordance with the invention. Such information, together with that provided in the Probstein et al. patent, provides an adequate disclosure of the invention as would be needed by those in the art to understand and practice the invention.

Figure 1:
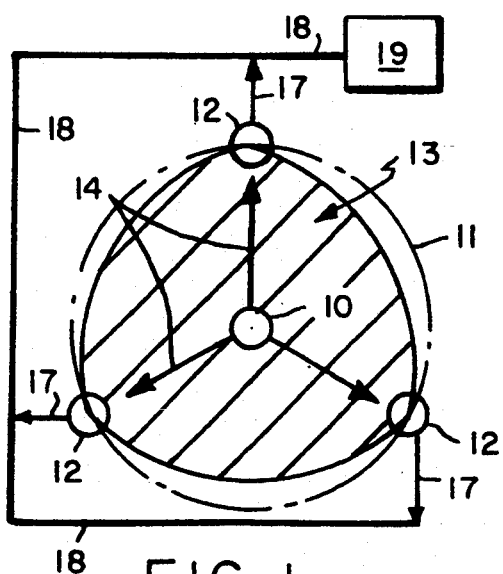
FIG. 1 depicts a plan view in diagrammatic form of an exemplary electrode pattern arrangement in a soil site in accordance with the invention.

As seen in the exemplary embodiment of FIG. 1, for example, a single source electrode 10 is positioned in a soil site 11 and has a plurality of three sink electrodes 12 which in the particular embodiment shown are substantially symmetrically positioned about the source electrode as shown. An electric field pattern will be developed in the soil site between the source electrode 10 and the sink electrodes 12 due to the supplying of different voltages at the source electrode and at the sink electrodes, which produce voltage gradients between the source electrode and each of the sink electrodes. A purging liquid is supplied to the source electrode in the manner described in the aforesaid Probstein et al. patent. Accordingly, an outward flow of contaminant from the source electrode 10 occurs in the soil site target region 13, a substantial portion of the flow being to the sink electrodes 12, as shown by arrows 14. The contaminant flowing to the sink electrodes can then be removed from the sink electrodes, as discussed below. Portions of contaminant that do not flow to the sink electrodes will flow to and remain in regions of the soil site which are between the sink electrodes 12 outside the target region 13. Accordingly, the soil site is effectively cleaned of contaminant material throughout the target region 13. Although the overall flow field in the target region normally will have a relatively complicated and non-uniform pattern, for simplicity the complete flow field pattern is not depicted in detail here.

Figure 2:
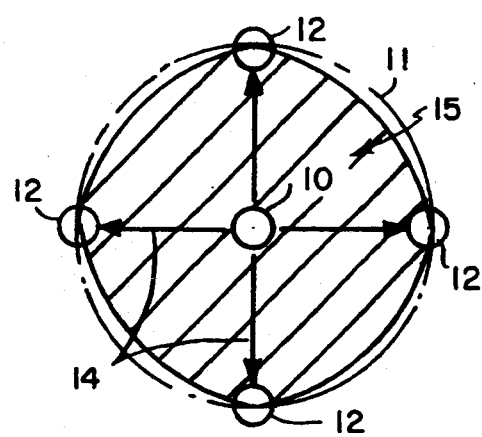
FIGS. 2 and 3 depict plan views in diagrammatic form of other exemplary electrode pattern arrangements in accordance with the invention.
Figure 3:
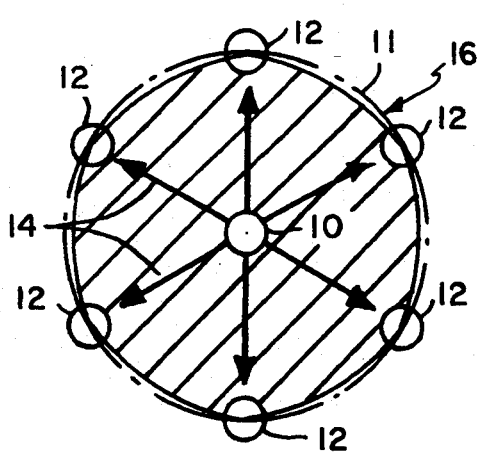

If additional sink electrodes are used, as seen in FIGS. 2 and 3, where four and six sink electrodes, respectively, are positioned about a source electrode 10, even more of the soil site will be cleared, as shown by purged target regions 15 and 16, respectively. It is clear that the use of even more sink electrodes would provide for cleaning of even more of the soil site region. A balance between the number of sink electrodes utilized about the source electrode and the costs of providing additional electrodes and accommodating the collection from all of the sink electrodes to achieve the increase in cleaning efficiency that results will normally determine the electrode pattern arrangement used in any particular application.

Figure 4:
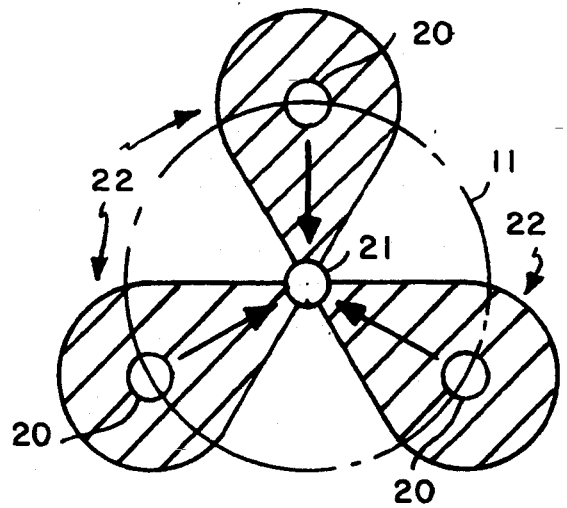
FIGS. 4–6 depict plan views in diagrammatic form of previously suggested exemplary electrode pattern arrangements.
Figure 5:
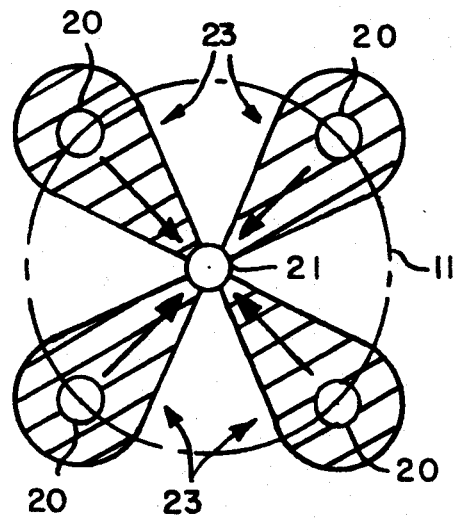
Figure 6:
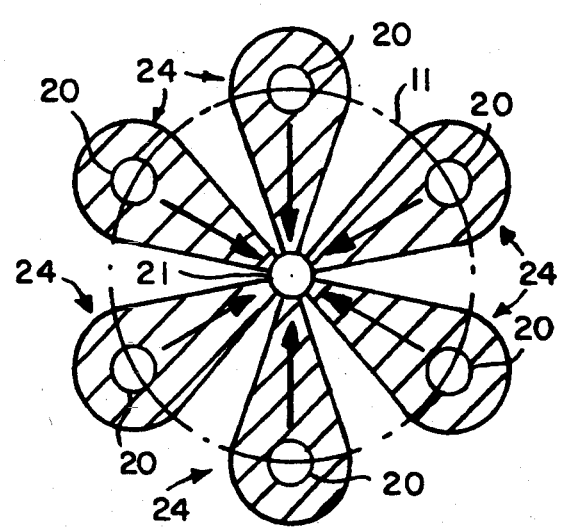

Such contaminant clearance patterns can be contrasted with those achieved by using patterns previously suggested for use in soil dewatering and consolidation processes, wherein a patterns which use a single sink electrode is surrounded by a plurality of source electrodes. As seen in FIG. 4, a plurality of three source electrodes 20 are symmetrically positioned about a single sink electrode 21 and the area from which the contaminant is removed is limited only to the three regions 22 depicted therein. While the areas of such regions will be increased when using four or six source electrodes 20, as shown by regions 23 and 24 in FIGS. 5 and 6, respectively, relatively large regions of the site in each case will still remain uncleaned, i.e., contaminant removal will not be achieved in such regions, thereby severely limiting the removal efficiency for the target region of the soil site.

The contaminant being removed from sink electrodes 12 in the exemplary configurations of the invention shown in FIGS. 1–3 can be suitably manifolded as shown specifically in FIG. 1 by a plurality of separate channels 17 connected from each electrode to a single common channel 18, preferably located at the surface of the site so that the contaminant material can be supplied to a suitable effluent collector 19 in a manner as discussed in the aforesaid Probstein et al. patent. Similar manifolding arrangements (for simplicity not shown) can be used in the patterns depicted in FIGS. 2 and 3.

While the voltage gradients between the source electrode and each of the sink electrodes are often the same, in some applications, in order to improve performance it may be desirable to provide different voltage gradients between the source electrode and different ones of the sink electrodes, as well as to provide voltage gradients among the sink electrodes themselves. Moreover, in some applications, it may be desirable to change the voltages supplied to the source and sink electrodes over time so as to provide time varying voltage gradients between the source electrodes and the sink electrodes, as well as between the sink electrodes. The flexibility achievable by being able to use uniform or non-uniform voltage gradients between the source electrodes and the sink electrodes as well as time variant voltage gradients permits the invention to provide the most effective soil site cleaning operations for many different applications.

Further, while the direction of flow in the target region will be generally in an outward direction from the source electrodes, the polarities of the voltages applied to the electrodes, i.e., whether the electrodes act as anodes or cathodes, will depend on the polarity of the charge of the soil in the soil site. Thus, in positively charged soil, for example, the sink electrodes can be anode electrodes and the source electrode is a cathode electrode, the flow taking place outwardly from the cathode source electrode toward the anode sink electrodes, while in negatively charged soil, the sink electrodes are cathodes and the source electrode is an anode, the flow taking place outwardly from the source anode toward the sink cathodes. If the polarity of the charge of the soil changes during a removal operation, the polarities of the voltages supplied to the electrodes can be appropriately changed accordingly to assure that the outward flow is maintained.

Figure 7:
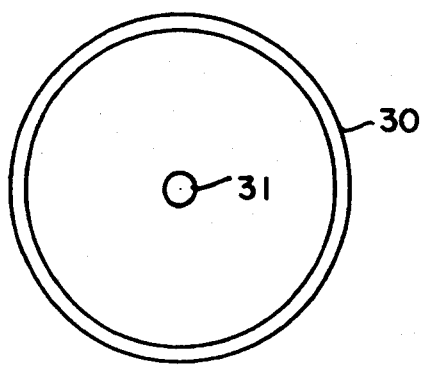
FIG. 7 depicts a plan view in diagrammatic form of an alternative electrode pattern arrangement in accordance with the invention using a continuously formed sink electrode.
Figure 8:
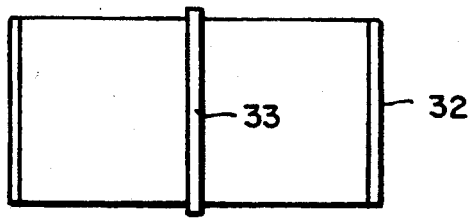
FIG. 8 depicts a view in section of the pattern of FIG. 7 using a cylindrically shaped sink electrode.
Figure 9:
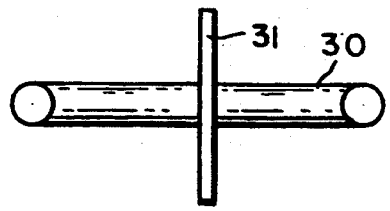
FIG. 9 depicts a view in section of the pattern of FIG. 7 using an annular shaped sink electrode.

Alternatively, rather than using a plurality of separate sink electrodes surrounding the source electrode, a single continuous sink, or collector, electrode 30 can be used, as shown in FIG. 7. The single sink electrode 30 has a closed geometric configuration so as to substantially completely surround the source electrode 31. In the exemplary embodiment, the continuous sink electrode 30 has a substantially circular configuration. Such sink electrode can have a substantially cylindrical shape as shown by electrode 32, the height of which is substantially coextensive with that of a cylindrical source electrode 33, as shown in FIG. 8. Alternatively, it may have an annular shape, as shown in FIG. 9. Any appropriate channel connection (not shown) can be made to the sink electrode to carry the contaminant material to an effluent collector.

Figure 10:
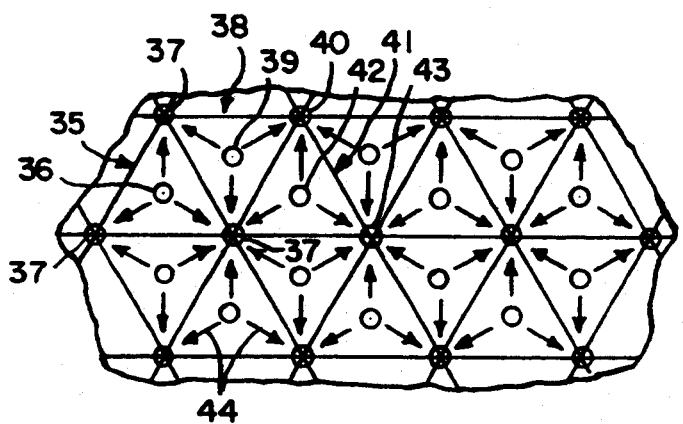
FIG. 10 depicts a plan view in diagrammatic form of a plurality of electrode pattern arrangements of the type shown in FIG. 1 to form a nested or tiled pattern thereof in a soil site.

For large scale soil sites, a plurality of patterns of the type depicted in FIGS. 1–3 can be used to effectively remove contaminants therein. Thus, as shown in FIG. 10, a first electrode pattern 35 comprises a source electrode 36 surrounded by three sink electrodes 37, a second electrode pattern 38 comprises a source electrode 39 surrounded by three sink electrodes, i.e., two of the sink electrodes 37 and a fourth sink electrode 40, a third electrode pattern 41 comprises a source electrode 42, surrounded by three sink electrodes, i.e., a sink electrode 37, a sink electrode 40, and a further sink electrode 43, and so forth, whereby a plurality of "nested" or "tiled" electrode patterns can be arranged to cover a relatively large soil site area. The outward flows in each pattern are as discussed above in FIG. 1 and generally shown by arrows 44.

Figure 11:
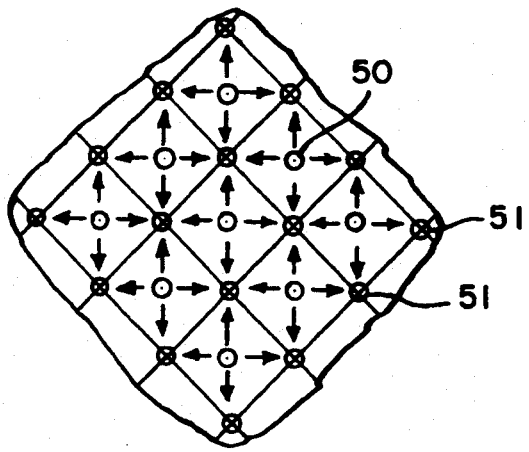
FIGS. 11 and 12 depict plan views in diagrammatic form of a plurality of electrode pattern arrangements of the type shown in FIGS. 2 and 3 to form alternative nested or tiled patterns thereof in a soil site.
Figure 12:
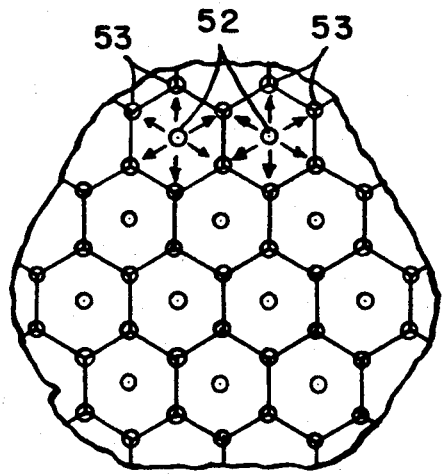

Alternative tiled electrode patterns using configurations in which the individual patterns are readily nested together are shown in FIGS. 11 and 12 which depict, respectively, the use of a single source electrode 50 and four sink electrodes 51 in each pattern, and the use of a single source electrode 52 and six sink electrodes 53 in each pattern, to produce the desired overall nested or tiled arrangements.

While in the particular embodiments of the invention discussed above, a single source electrode is used, alternatively, several source electrodes which are closely spaced together at the center of each pattern can be used, the same voltage preferably being supplied to each of the source electrodes in such case. Moreover, while for purposes of explanation the sink electrodes in FIGS. 1-3, for example, are shown as substantially symmetrically positioned about the same source electrode, in some cases, for different soil site shapes or where the properties of the soil site material may not be uniform throughout the site, it may not be desirable to position the sink electrodes symmetrically about the source electrode but rather to place them in an appropriate non-symmetrical pattern to better fit the soil site shape or material variations. Moreover, even when the sink electrodes are symmetrically positioned, they need not form a circular pattern thereof and may assume another geometric shape, e.g., a square, rectangular or other appropriate geometric shape. Other modifications may occur to those in the art within the spirit and scope of the invention. Hence, the invention is not to be construed as limited to the specific embodiments described except as defined by the appended claims.

What is claimed is:

1. A method of removing a contaminating material from a soil site comprising the steps of
    positioning a single source electrode at a first location within said soil site;
    positioning a plurality of only sink electrodes at second locations around said source electrode;
    establishing voltage gradients between said source electrode and said plurality of sink electrodes;
    supplying a non-contaminating purging liquid from a source thereof external to said soil site to said source electrode, said source electrode being arranged to permit said purging liquid to flow from said source electrode into said soil site, the one or more voltage gradients causing said purging liquid to move by electroosmosis through said soil site outwardly from said source electrode toward said sink electrodes and to displace said material so as to cause a substantial portion of the displaced material to be moved from said soil site into said one or more sink electrodes; and
    removing said material from said sink electrodes.

2. A method in accordance with claim 1, and further wherein a portion of the displaced material is moved from the soil site to regions outside said soil site.

3. A method in accordance with claim 1, wherein said sink electrodes are substantially symmetrically positioned around said source electrode.

4. A method in accordance with claim 1, wherein at least three sink electrodes are positioned around said source electrode.

5. A method in accordance with claim 1, wherein the voltage gradients between said source electrode and each of said sink electrodes are substantially the same.

6. A method in accordance with claim 1, wherein the voltage gradient between said source electrode and each of said sink electrodes are different and voltage gradients are established among said sink electrodes.

7. A method in accordance with claim 1, wherein the voltage gradients between said source electrodes and each of said sink electrodes vary with time.

8. A method in accordance with claim 1, wherein the polarities of the voltage gradients between said source electrodes and each of said sink electrodes depend on the polarity of the charge of the soil in said soil site.

9. A method in accordance with claim 1, wherein said source electrode comprises a plurality of source electrodes positioned closely together.

10. A method in accordance with claim 1, wherein said removing step comprises
    removing soil material from each sink electrode via separate channels; and
    combining the removed material from each of said separate channels into a single channel for delivery to a collector.

11. A method of removing contaminating material from a soil site comprising the steps of
    positioning a plurality of source electrodes at selected locations within said soil site;
    positioning sink electrodes within said soil site at locations such that within a specified distance from each source electrode, each source electrode is surrounded only by a plurality of sink electrodes;
    establishing voltage gradients from each said source electrode and its surrounding sink electrodes;
    supplying a non-contaminating purging liquid from a source thereof external to said soil site to each of said source electrodes, each said source electrode being arranged to permit said purging liquid to flow from said source electrode into said soil site, the one or more voltage gradients causing said purging liquid to move by electroosmosis through said soil site outwardly from each source electrode toward the sink electrodes surrounding each said source electrode and to displace said material so as to cause the displaced material to be moved from said soil site into said sink electrodes; and
    removing said materials from said sink electrodes.

12. A method in accordance with claim 11, wherein at least some of the sink electrodes surrounding each of said source electrodes are commonly used to surround a source electrode and one or more neighboring source electrodes so that a plurality of combinations of a source electrode and associated surrounding sink electrodes are formed in a nested fashion throughout said soil site.

13. A method in accordance with claim 11, wherein each source electrode is surrounded by four electrodes within a specified distance of each source electrode.

14. A method in accordance with claim 11, wherein each source electrode is surrounded by six sink electrodes within a specified distance of each source electrode.

15. A method of recovering a contaminating material from a soil site comprising the steps of
    positioning at least one source electrode at a selected location within said soil site;
    positioning a continuously formed sink electrode having a selected geometric configuration at a location wherein the continuous sink electrode surrounds said at least one source electrode;

establishing a radially outwardly directed voltage gradient between said at least one source electrode and said surrounding continuously formed sink electrode;

supplying a non-contaminating purging liquid from a source thereof external to said soil site to said at least one source electrode, and at least one source electrode being arranged to permit said purging liquid to flow from said at least one source electrode into said soil site, the one or more voltage gradients causing said purging liquid to move by electroosmosis through said soil site toward said continuously formed sink electrode and to displace said materials so as to cause the displaced material to be moved from said soil site into said sink electrode; and removing said material from said sink electrode.

16. A method in accordance with claim 15 and further including the steps of forming said continuously formed sink electrode to provide a closed geometric configuration around said at least one source electrode.

17. A method in accordance with claim 16, wherein said continuously formed sink electrode is formed to have a substantially circular configuration.

18. A method in accordance with claim 17, wherein said continuously formed circular sink electrode has an annular configuration.

19. A method in accordance with claim 17, wherein said continuously formed circular sink electrode has a cylindrical configuration.

* * * * *